United States Patent Office 3,395,800
Patented Aug. 6, 1968

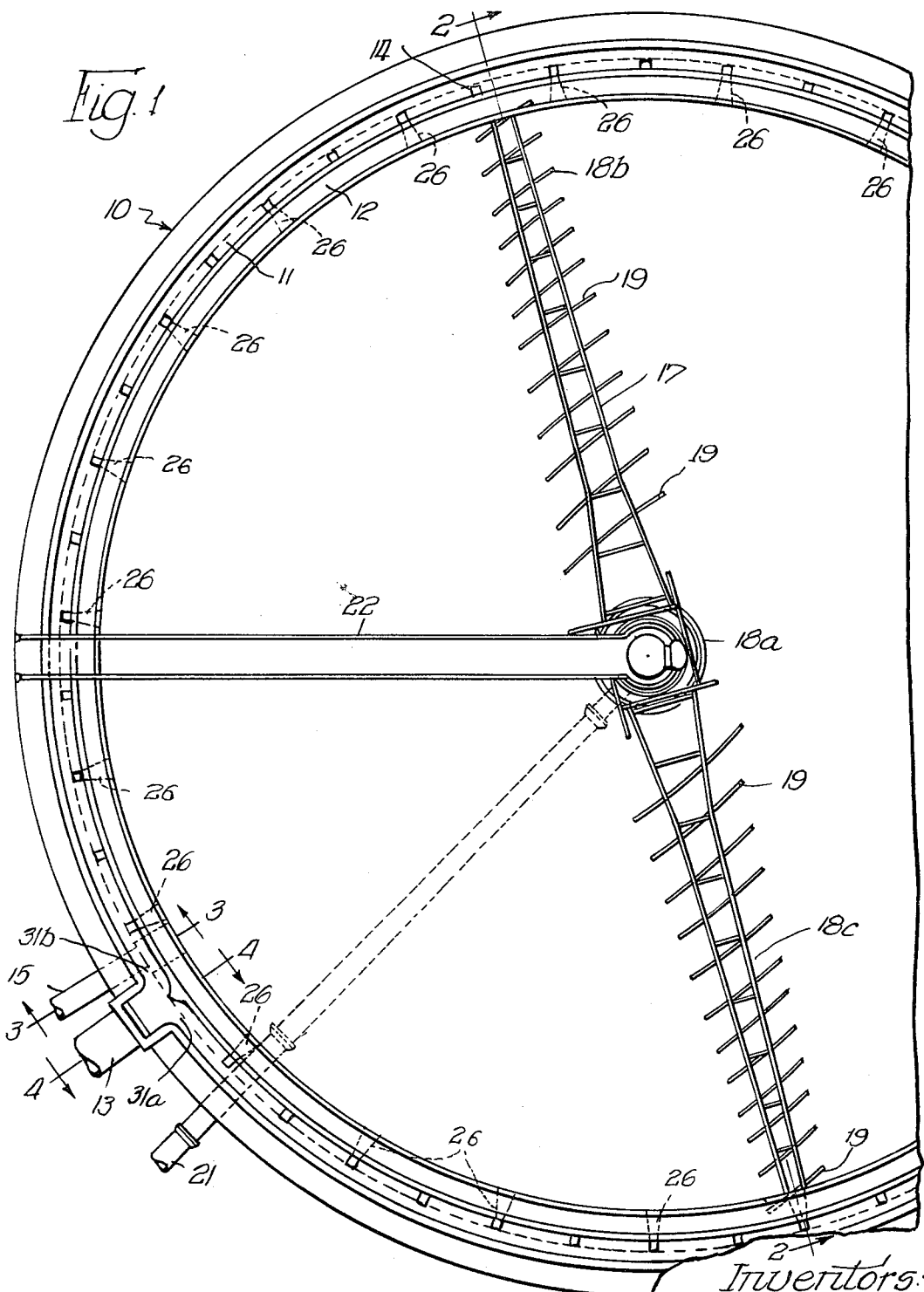

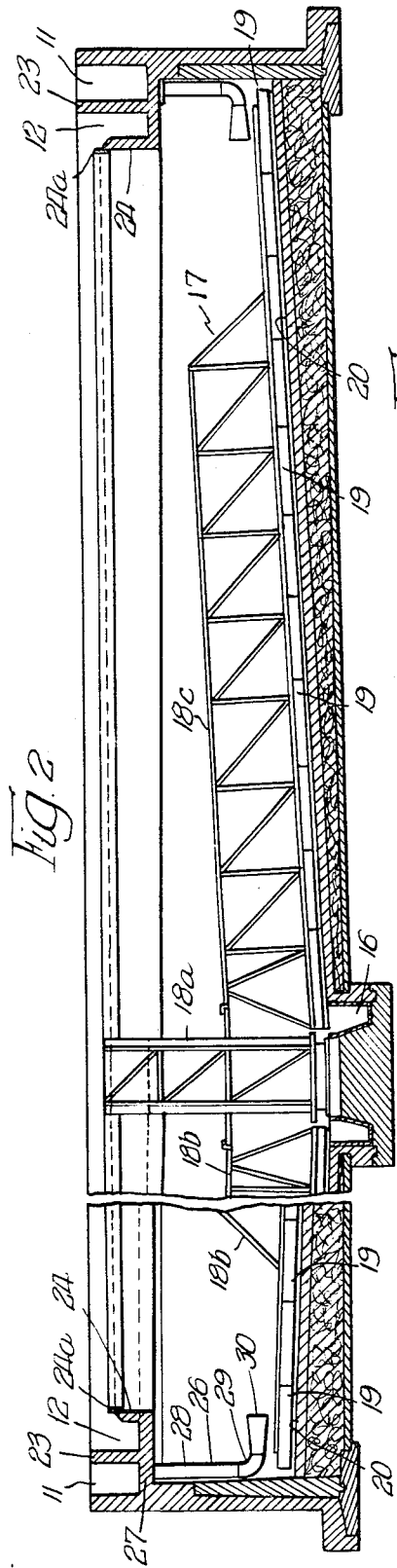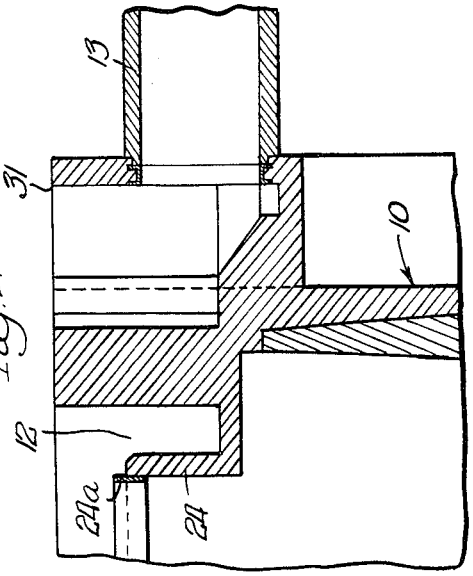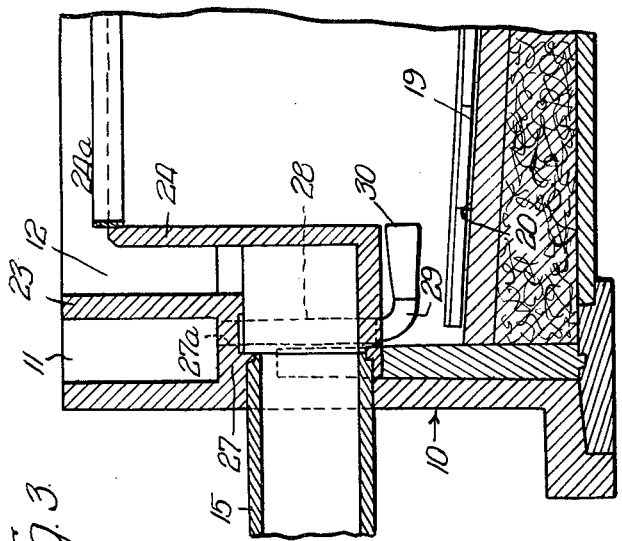

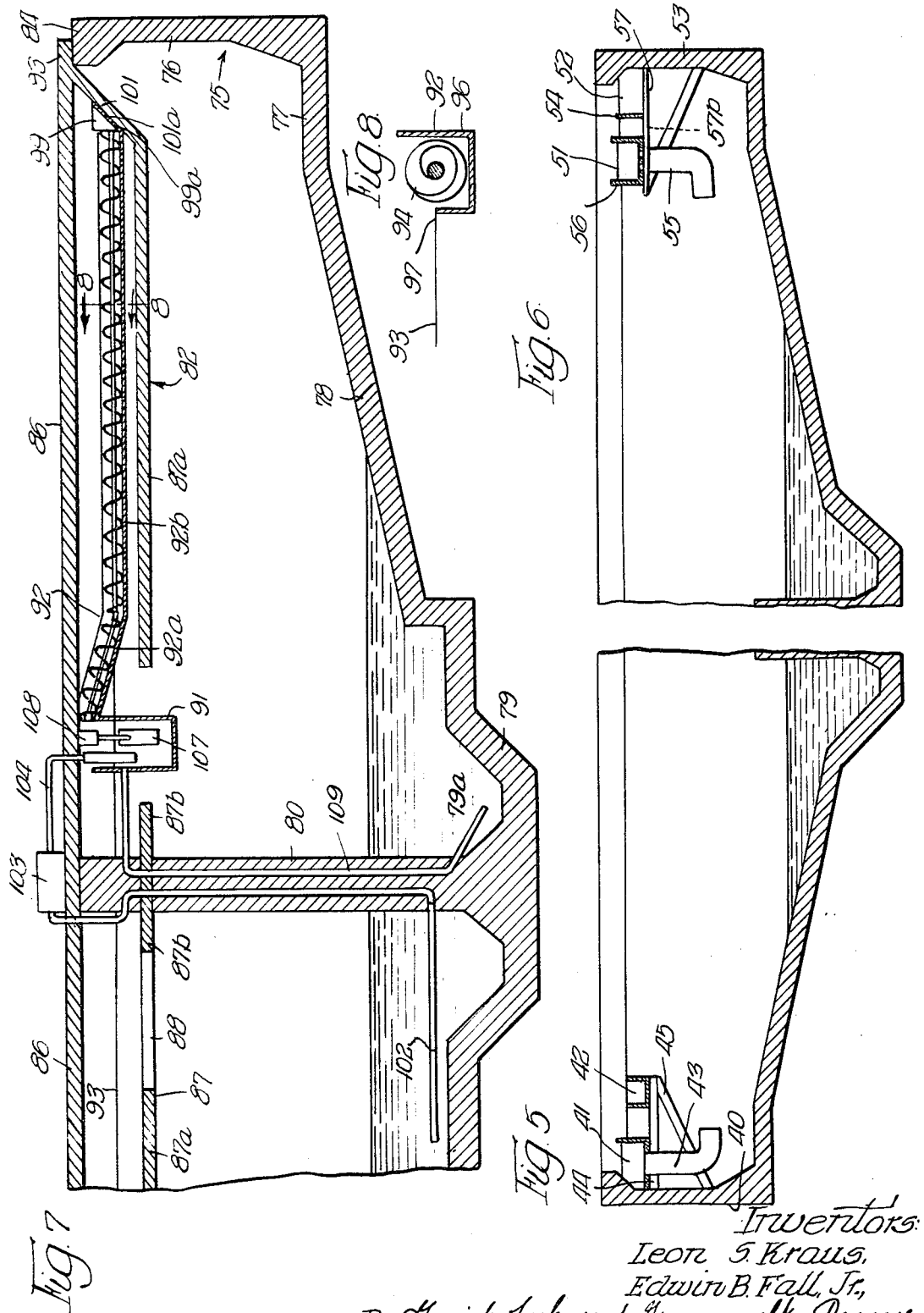

3,395,800
SEWAGE TREATMENT AND APPARATUS THEREFOR
Leon S. Kraus, 1116 W. Moss Ave., Peoria, Ill. 61606, and Edwin B. Fall, Jr., 207 Twin Oaks Court, East Peoria, Ill. 61611
Filed July 23, 1965, Ser. No. 474,389
16 Claims. (Cl. 210—66)

ABSTRACT OF THE DISCLOSURE

A settling tank for effecting gravitational settling of solids from a liquid feed containing the same which settling tank includes influent and effluent channels arranged on the outer peripheral portions of the tank. The influent and effluent channels are preferably substantially continuous around such settling tank and in juxtaposition to each other. A plurality of downcomers or equivalent influent discharge means are mounted to the influent channel.

A scum remover which can be used either alone or in the above-described settling tank includes a skimmer mounted to the settling tank for collecting scum and other low density materials floating on the liquid surface thereof, a mixing chamber mounted to the tank and means for transmitting the scum and other low density materials collected by the skimmer into the mixing chamber.

---

The present invention relates to improvements and innovations in the treatment of sewage and industrial wastes. More particularly, this invention is concerned with a novel means for effecting substantially improved settling tank operation in sewage treatment installations. This invention is also concerned with a unique means for disposing of scum and other low density waste materials which separate out and float on the liquid surface in a sewage treatment settling tank. Both of these aspects of the present invention can be cooperatively combined for highly effective conjoint operation in primary and secondary settling tanks.

Population growth and industrial expansion have produced substantially increased quantities of sewage which must be effectively processed and treated in sewage treating plants in order to minimize pollution and contamination of natural and man-made waterways. These increased demands have generally been met by the construction of new sewage treating plants with settling tanks of a much larger size. Similarly, in existing sewage treating plants additional settling tanks have been built in order to provide the needed increased capacity. The construction of these larger settling tanks involves not only a major expense to a community or industrial plant but also necessitates an allocation of land which might be advantageously used in some other capacity.

The present invention provides a unique means for substantially increasing the capacity of a settling tank without reducing its efficiency of separation. Thus, existing settling tanks can be easily converted over to embody this invention and thereby increase their present capacity by two or three times. Similarly, new settling tanks for handling a given volume of sewage can be built to a fraction of the size of conventionally designed tanks. For example, it has been found that primary settling tanks constructed in accordance with the present invention have inflow settling rates of well over 2500 gallons per square foot per day as compared to around 1000 gallons per square foot per day for conventionally designed primary settling tanks.

Conventional settling tanks generally have a central feed well or influent flow discharge and a peripheral overflow-connection trough. Alternatively, some installations embody a peripheral feeding or influent flow discharge and a central effluent connection trough. In accordance with the present invention, it has been discovered that the increased inflow settling rates described above can be obtained by locating both the influent and effluent channels along the outer periphery of a settling tank and combining this unique arrangement with a novel influent flow discharge technique. This flow discharge technique essentially consists of discharging the influent below the water surface in a generally horizontal direction and at a velocity which induces flow towards the center of the tank at a low level and produces a surface flow toward and over the effluent weirs located along the periphery of the settling tank.

As will be more fully explained below, the present invention also includes a novel scum removal technique which involves the collection of scum and other low density materials floating on the liquid surface of the settling tank and depositing them into a mixing chamber into which sludge from the bottom of the settling tank has been pumped. The ratio of the respective materials is such as to insure that the density of the scum will be increased to an extent that it will remain with the sludge. The scum and sludge composite can then be pumped to the bottom of the settling tank where it remains until disposed of with the unmixed sludge through the sludge-discharge outlet in the settler. It will thus be appreciated that the heretofore difficult problem of scum disposal is completely eliminated by the present invention.

It is therefore an object of the present invention to provide an improved method and apparatus for the treatment of sewage and industrial wastes.

Another object of the present invention is to provide a new and improved settling tank construction characterized by substantially increased inflow settling rates over those obtainable with conventionally designed settlers.

Another object of the present invention is to provide a novel settling tank design which will enable the construction of settling tanks that are able to handle capacities heretofore only able to be adequately processed in settling tanks of a much larger size.

Another and important object of the present invention is to provide a novel arrangement for the influent and effluent channels in a settling tank which results in substantially improved operation.

A further object of the present invention is to provide a unique inflow feed technique in a settling tank which effects more efficient surface flow toward and over effluent weirs.

A further object of the present invention is to provide a novel influent flow discharge arrangement in a settling tank wherein the influent is introduced into the tank substantially horizontally and just high enough off the bottom so as not to disrupt the settled sludge while, at the same time, assisting in flow of sludge to a central draw-off location.

Another object of the present invention is to provide a novel and improved influent and effluent channel arrangement in a settling tank wherein the influent channel member acts to prevent scum from traveling into the effluent channel.

Another object of the present invention is to provide means for single stream disposal of scum and sludge in a sewage treatment settling tank.

A further object of the present invention is to provide a unique scum disposal technique wherein scum and other low density material floating on the surface of the settling tank is transferred to a mixing chamber into which sludge is also pumped for the combined mixing thereof so as to increase the density of the scum to closely approximate that of the sludge for facilitating single stream disposal of these two materials.

Other and further objects of the present invention will be apparent from the following detailed description of the following drawings wherein:

FIG. 1 is a fragmentary plan view of the primary settling tank embodying certain features of the present invention;

FIG. 2 is a broken sectional view of the same settling tank taken along the line 2—2 in FIG. 1;

FIG. 3 is an enlarged fragmentary sectional view of the same settling tank taken along the line 3—3 in FIG. 1;

FIG. 4 is an enlarged fragmentary sectional view of the same settling tank taken along the line 4—4 in FIG. 1;

FIG. 5 is a partially schematic fragmentary sectional view of another embodiment of the present invention;

FIG. 6 is a partially schematic fragmentary sectional view of a third embodiment of the present invention;

FIG. 7 is a partially schematic fragmentary sectional view illustrating the novel scum removal technique of the present invention; and FIG. 8 is an enlarged sectional view taken along the line 8—8 in FIG. 7.

In the embodiment of the invention illustrated in FIGS. 1–4 the reference numeral 10 generally designates a circular settling or settlementation tank having an influent channel 11 located along the outer periphery thereof and an effluent channel 12 inwardly spaced therefrom in juxtaposition therewith. Influent channel 11 is fed through an influent feed line 13 and is adapted to provide generally uniform feed to the settling tank through a plurality of downcomers 26 evenly spaced along the channel 11. Effluent outlet 15 communicates effluent channel 12 with other treating units in the sewage treatment system for further purification in accordance with the flow pattern of the particular plant. For example, if settling tank 10 were the primary settling tank in the treatment system, effluent outlet 15 could desirably communicate with aeration tanks. On the other hand, if tank 10 were used as a secondary or final settling tank the effluent therefrom could be transmitted to a retention pond.

As is illustrated, settling tank 10 is equipped with a sweeping device 17 for moving sludge collected on the bottom of the tank to a central outlet (not illustrated) located in a sump portion 16 of the settling tank 10. Sweeping device 17 includes a vertically extending central support member 18a from which a pair of rotatable radial arms 18b and 18c extend. Each of the radial arms 18b and 18c has a plurality of adjustably positionable plow blades 19 mounted thereto. As the arms 18b and 18c rotate, plow blades 19 sweep the sludge collected on the floor 20 of settler 10 into the sump 16 from where it is pumped through a sludge withdrawal line 21 by a sludge pump (not illustrated) for further treatment and/or disposal. If desired, a walkway 22 communicating the outer periphery of the tank 10 with the central support member 18a can be provided.

In the embodiment illustrated in FIGS. 1–4 effluent channel 12 is positioned immediately adjacent influent channel 11 with a common wall 23 separating the two channels. Inner circumferential wall 24 serves as an effluent weir which is equipped with an adjustable top edge member 24a. This novel settling tank construction, viz. where the influent and effluent channels are both located along the peripheral portions of the tank, enables the formation of flow patterns in the settling tank which greatly facilitate the gravitational settling of the solid constituents in the sewage feed.

An important aspect of the present invention is the downcomer construction which provides a novel influent discharge into the settling tank 10 and cooperates with the unique channel construction described above to provide significantly increased inflow settling rates.

In principle, the unique influent flow discharge technique of the present invention involves the introduction of the influent feed into the settler in such manner so as to effect an undersurface flow of the newly entering solids-containing liquid feed toward the center of the settler and a corresponding surface flow of the liquid after most of the solids constituents thereof have settled to the bottom of the tank. The undersurface flow of the newly entered influent feed can be accomplished by discharging the influent feed under the liquid surface in a generally horizontal direction and at as low a level as possible without disrupting the sludge which has previously settled on the bottom floor of the tank. Influent feed velocity should be carefully controlled so as to effect the desired results and will vary somewhat in accordance with the physical characteristics of the settling tank, i.e. tank size, shape and construction. In preliminary testing of the invention an influent velocity of from about 1 to 2 feet per second has been found to be suitable.

One embodiment of the novel influent flow discharge means of the present invention is illustrated in FIGS. 1, 2 and 3. As is shown, a plurality of L-shaped downcomers 26 capable of providing controlled direction flow are mounted to the bottom wall 27 of influent channel 11. Each of the downcomers 26 includes a straight pipe section 28, one end of which is sized to be received in an opening 27a in the bottom wall 27. A 90° elbow pipe section 29 extends from the opposite end of pipe section 28 and, if desired, can be connected with an openly flared discharged nozzle 30. In this connection, it should be noted that nozzle 30 is not essential and can be eliminated since elbow section 29 will usually be sufficient to direct the influent feed into the settler 10 in a substantially horizontal direction so that it does not disrupt the settled sludge on the tank bottom. Tests conducted with settling tanks equipped with the channel and downcomer construction of the present invention indicate that most of the influent feed travels completely across the tank with the effluent constituent thereof passing over the weir section directly opposite from the point of entry in the tank. A certain amount of influent feed however, will travel in a semi-circular path, wherein the influent upon entering the tank travels along the lower surface thereof until it reaches about the middle of the tank with the effluent constituent doubling back along the surface and entering the effluent channel at a location which is generally directly over the discharge nozzle through which it entered.

Another ancillary benefit obtained with the downcomer design of the present invention is that it facilitates the flow of sludge to the central draw-off location. Thus, while the downcomer is preferably at a level at which it will not recirculate settled sludge, the undersurface currents urge the sludge toward the center of the tank, thereby facilitating sludge removal.

The significantly improved settling tank operation achieved by the unique channel arrangement and downcomer construction of the present invention were vividly demonstrated in a 30 day test run. The resuts of this test are tabulated below with the data in column I showing the operation of a primary settling tank constructed in accordance with this invention and the data tabulated in column II showing the operation of a primary settling tank of conventional design. All figures represent averages of data covering the entire 30 day test period.

| | I | II |
|---|---|---|
| Rate of Flow (m.g.d.) | 11.68 | 4.76 |
| Suspended Solids (mg./l.): | | |
| Raw Sewage | 424 | 424 |
| Influent to tanks contains waste activated sludge—approximately 400–500 mg./l. suspended solids above the raw sewage suspended solids. | | |
| Effluent (mg./l.) | 293 | 283 |
| Percent Removal | 30.9 | 33.3 |
| Inflow Settling Rate (Gal. per Sq. Ft. per Day) | 2,781 | 1,133 |

The influent settling rate achieved in the primary settler constructed in accordance with the present invention was 2.45 times greater than that obtained with the conventional-designed primary settlers (i.e. 2781 gallons per square foot per day as compared to 1133 gallons per square foot per day). In this connection it is interesting to note that the Water Pollution Control Federation—Manual of Practice—Sewage Treatment Plant Design indicates a settling rate of 1000 gallons per day for conventionally designed primary settling tanks. The significance of the substantially improved operation obtained in settlers designed in accordance with the present invention becomes apparent when it is noted that the efficiency (percent removal) of the primary settler (I) embodying the features of this invention was approximately the same as that obtained with the conventionally designed settler (II) despite the fact that settler I was the same size as settler II and received about 2.5 times the flow settler II received.

Similar tests were made on a secondary settling tank in an activated sludge process. This data is tabulated below and represents readings made over an 18 day period at sustained rates of flow for an average period of 13 hours per day. Column III shows the data on the operation of a secondary settling tank constructed in accordance with the present invention while the data tabulated in column IV represents that obtained on a secondary settling tank of conventional design.

|  | III | IV |
|---|---|---|
| Aeration Liquor Inflow Suspended Solids (mg./l.) | 3,400 | 3,400 |
| Effluent Suspended Solids (mg./l.) | 27 | 21 |
| Inflow Settling Rate (Gal. per Sq. Ft. per Day) | 2,760 | 1,000 |

Here again it is interesting to note that the inflow settling rate of the secondary settler constructed in accordance with the present invention was 2.76 times greater than that obtained with a conventional secondary settler (2760 gallons per square foot per day as compared to 1000 gallons per square foot per day) with no substantial difference in the suspended solids concentration of the effluent. The Water Pollution Control Federation—Manual of Practice—Sewage Plant Design indicates an inflow settling rate of 1250 gallons per square foot per day for conventionally designed secondary settlers.

FIG. 4 illustrates the communication of feed inlet 13 with effluent channel 11. As is best seen in FIG. 1, coupling section 31 is provided with a pair of diverging open ends 31a and 31b which are each received in channel 11 to form a continuous U-shaped cross-sectioned influent channel.

While the settling tank illustrated in FIGS. 1–4 is shown to be of a circular construction, it should be realized that the novel channel positioning and downcomer construction of the present invention can also be advantageously employed in square and rectangular shaped settling tanks. In these installations, however, it is preferred that the downcomers be positioned along the periphery of a tank in such fashion so as to avoid turbulence at the corners. This can easily be accomplished by locating the downcomers nearer the center of each side of the settling tank and avoiding the placement of downcomers on adjacent sides in a corner in such manner that their discharge flows intersect each other.

Another embodiment of the influent-effluent channel arrangement is illustrated in FIG. 5. As is shown, the reference numeral 40 indicates a settling tank wherein the influent channel 41 is arranged in spaced-away relationship from the effluent channel 42. A downcomer 43 substantially, as described in the previous embodiment, is also shown. The influent and effluent channels are mounted on a shelf 44 which in turn is braced by a support member 45. Thus, it should be noted, that it is not essential to the present invention that the influent and effluent channels be mounted in juxtaposition to each other.

A third embodiment of the present invention is illustrated in FIG. 6. This design closely resembles that of the embodiment illustrated in FIG. 5 in that the influent and effluent channels are in spaced-away relationship to each other. The primary distinctions, however, between these two embodiments are that the influent channel 51 is positioned inwardly of effluent channel 52 and that the support shelf 57 is provided with a plurality of holes 57b which enable the flow of fluid therethrough. Downcomer 55 is mounted as described in the previously mentioned embodiments while the influent feed to channel 51 (not illustrated) can be from either from above or the same level as the channel 51. Effluent conduit 52 is connected to an outlet comparable to that identified by the reference numeral 15 in FIG. 1. Accordingly in this embodiment, the effluent constituent of the feed travels underneath influent channel 51 in order to reach effluent weir 54. This channel arrangement offers an additional advantage to those described previously in that with this construction the wall 56 of the influent channel member 51 operates to keep the scum and other low density materials floating on the water surface of tank 53 from reaching effluent weir 54 and contaminating the effluent stream.

FIGS. 7 and 8 schematically illustrate the novel scum removal means of the present invention. In the illustrated embodiment, the reference number 75 generally designates a settling tank having a vertical side wall 76 extending into a radially inwardly extending base portion 77 which, in turn, extends into a tapered section 78 terminating in a sump defining portion 79. A centrally disposed, vertically extending shaft 80 supports a housing 82. Housing 82 has its outer peripheral section formed in a radially extending lip 83 which is supported on the top edge 84 of the wall 76.

As is shown, housing 82 comprises an upper wall 86 and a lower wall 87. Lower wall 87 includes an outer section 87a and an inner section 87b with an annular opening 88 therebeween which enables rotation of a mixing chamber 91 around the interior of the settling tank 75. Mixing chamber 91 is connected to a skimmer 92 which can be selectively elevated or lowered in accordance with the water level for picking up scum and other low density materials floating on top of the water surface 93 and transporting the same into the interior of the mixing chamber 91.

As is best illustrated in FIG. 8, skimmer 92 includes an elongated screw type conveyor member 94 rotatably mounted in a casing 96. Casing 96 is constructed with a skimming edge 97 on shorter wall 98 of the skimmer 92 facing the direction of rotation. In the illustrated embodiment, skimmer 92 is adapted to rotate in a clockwise fashion around the top surface of the liquid contained in the settling tank 76.

The outermost section of skimmer 92 is fixedly mounted to a support member 99 and is adapted to ride upon the inclined surface 101 of the housing 82. Suitable means for facilitating the rotational movement of member 99 on the inner surface of inclined wall 101 can be provided. This can be in the form of a bearing mechanism or, if desired, the contacting surfaces 99a and 101a can be provided with a coating of a self lubricating material, such as, for example, Teflon.

In the particular embodiment illustrated in FIG. 7, the location of mixing chamber 91 controls the positioning of the inclined and horizontal skimmer sections 92a and 92b, respectively, and thereby affects the inward point at which scum material will be picked up by the screw conveyor 94. While not specifically illustrated, mixing chamber 91 could be mounted so that it is centrally located in the settling tank 75 (i.e. in line with vertically extending shaft) enabling skimming arm 92 to extend closer toward the center of the tank. Alternatively, an auxiliary skimmer can be provided for picking up the scum material located around the immediate center of the settling tank 75 into the mixing chamber 91. Accordingly, it should be realized that the specific skimmer construction shown merely illustrates the principles of the present invention and may be varied in considerable detail without any departure from the inventive concepts disclosed and described herein.

Tubular conduit 102 is arranged to communicate the lowermost portion of settling tank 75 wherein sludge material has settled with the suction side of a sludge pump 103. The outlet side of sludge pump 103 is connected to a conduit 104 which deposits the pumped sludge into the mixing chamber 91. Sludge pumped from the bottom of the tank 75 is thus combined with the scum material picked up along the top surface of the liquid. A suitable homogenizer or mixing device 107 connected to a motor 108 provides good mixing of the lighter scum material with the heavy sludge.

After thorough mixing of the scum and sludge, the scum-sludge composite formed is then delivered to sump portion 79a of tank 75 through conduit 109. In practice, it has been found necessary to mix relatively large amounts of sludge with small amounts of scum in order that the scum-sludge composite formed would be sufficiently heavy so that it would remain on the bottom of the tank. The scum, now mixed with sludge, can be pumped with the sludge in a single stream operation. Thus, the heretofore difficult problem of disposing of scum and other low density materials present with sewage and other industrial wastes is completely eliminated.

While, in the illustrated embodiment, a rotating skimmer 92 it should be noted that in some operations skimmer 92 be stationary. In these installations, it is desirable to provide some means for urging the scum material floating on the top surface toward the skimming edge 97 of the skimmer 92. This can be accomplished by means of a series of slow moving paddles or like devices which provide movement of the top surface of the water toward the skimmer.

It will be appreciated that various modifications and variations from the embodiments of the present invention illustrated and described herein may be made without departing from the spirit and scope of this invention. Accordingly, this invention is to be limited only by the scope of the appended claims.

We claim:

1. The method of disposing of scum and other low density materials which float on the surface of a liquid in a settler adapted to provide gravitational settling of sewage and industrial wastes, comprising
   skimming the surface of the liquid in said settler to remove scum and other low density materials floating thereon,
   delivering said scum and other low density materials into a mixing chamber,
   pumping sludge from the bottom of said settler into said mixing chamber,
   combining said scum and low density materials in said mixing chamber with said sludge to form a scum-sludge composite having a density heavier than that of the liquid contained in the settler, and
   delivering said scum-sludge composite to the bottom of said settler, whereby said scum-sludge composite and unmixed sludge in the bottom of said settler can be simultaneously removed as a single stream discharge from said settler.

2. The method of processing a solids-containing liquid for effecting improved gravitational settling of the solids constituents in said liquid and for removal of scum and other low density materials which collect on the surface of said liquid, said method comprising the steps of introducing the solids-containing liquid influent into a settling tank adjacent the bottom peripheral portion thereof in a generally horizontally directed flow path and at a velocity adapted to cause an undersurface flow of the influent toward the central portion of said tank and a surface flow of the liquid away from said central portion toward the periphery of said tank, withdrawing the liquid at locations along the upper periphery of said tank, skimming the surface of the liquid in said tank to remove scum and other low density materials floating thereon, delivering said scum and other low density materials into a mixing chamber, pumping previously settled solids from the bottom of said tank into said mixing chamber, combining said scum and low density materials in said mixing chamber with the previously settled solids to form a scum-solids composite having a density heavier than that of the liquid contained in the tank and delivering said scum-solids composite to the bottom of said tank whereby said scum-solids composite and settled unmixed solids can be simultaneously removed on a single stream basis.

3. The method of processing a solids-containing liquid for effecting improved gravitational settling of the solids constituents in said liquid, comprising introducing the solids-containing liquid influent into a settling tank from a plurality of influent discharge members which communicate with a peripherally located influent channel, said influent being discharged into said tank adjacent the bottom peripheral portion thereof in a generally horizontally directed flow without resuspending a substantial portion of the solids which have previously settled on the bottom of said tank, said influent being directed toward the central portion of said tank at a flow rate which will cause an undersurface flow of said influent toward the central portion of the tank and a surface flow of liquid away from said central portion toward the periphery of said tank, and withdrawing the liquid from said tank at locations along the upper periphery thereof.

4. The method of claim 3 wherein the liquid is withdrawn along substantially the entire upper periphery of said tank.

5. The method of claim 3 wherein said influent is introduced into a rectangular settling tank through influent discharge members which are positioned along opposed walls of said tank in a manner by which turbulence in the tank corners is effectively avoided.

6. The method of claim 3 wherein said influent is introduced into a circular settling tank through influent discharge members which are positioned along substantially the entire peripherally located influent channel thereof.

7. The method of claim 3 wherein said influent upon being introduced into said tank from said plurality of influent discharge members provides an undersurface liquid flow which produces a flow of the settled solids toward the central portion of said tank, thereby facilitating removal of such solids from a generally centrally located solids discharge outlet.

8. Apparatus for processing a solids-containing liquid to effect improved gravitational settling of the solids constituents in said liquid, comprising a tank including a base and surrounding wall structure means defining an influent channel located adjacent the peripheral portion of said tank, means defining an effluent channel located adjacent the peripheral portion of said tank and adapted to receive a surface flow of liquid within said tank, a plurality of discharge members connected to said influent channel, each of said discharge members having a discharge opening adjacent the lower end thereof for discharging the solids-containing liquid influent into said tank adjacent the bottom peripheral portion thereof in a generally horizontal direction without resuspending a substantial portion of the solids which have previously settled on the bottom floor of said tank, said influent discharge members being arranged along said influent channel and having their discharge openings directed toward the central portion of said tank and sized to cause an undersurface flow of the solids-containing influent toward the central portion of said tank and a surface flow of said liquid away from said central portion toward said effluent channel.

9. The apparatus of claim 8 wherein said tank is generally rectangular and said plurality of influent discharge members are disposed along the periphery of said tank in a manner by which turbulence in the corner portions thereof is effectively avoided.

10. The apparatus of claim 8 wherein said influent channel is substantially continuous along the periphery of said tank.

11. The apparatus of claim 8 wherein said effluent channel is substantially continuous along the periphery of said tank.

12. The apparatus of claim 8 wherein said influent and effluent channels are substantially continuous along the outer periphery of said tank and in juxtaposition to each other.

13. The apparatus of claim 8 wherein said influent and effluent channels are substantially continuous along the outer periphery of said tank and at substantially the same elevation.

14. The apparatus of claim 8 wherein each of said influent discharge members has a generally downwardly extending portion which extends into a generally horizontal portion equipped with a discharge opening which is generally directed toward the central portion of said tank.

15. In a settling tank, the improvement comprising a skimmer mounted to said tank for collecting scum and other low density materials floating on the liquid surface in said tank, a mixing chamber mounted to said tank, means for transmitting the scum and other low density materials collected by said skimmer into said mixing chamber, means for delivering sludge from the bottom of said settling tank into said mixing chamber to form a scum-sludge composite therein, and means for transmitting the scum-sludge composite formed in said mixing chamber to the bottom of said settling tank.

16. The settling tank of claim 15 wherein said skimmer is mounted for rotational movement within said settling tank.

References Cited
UNITED STATES PATENTS

| | | | |
|---|---|---|---|
| 1,493,861 | 5/1924 | Kusch. | |
| 1,921,689 | 8/1933 | Meurk | 210—73 |
| 2,069,024 | 1/1937 | Vohmann et al. | |
| 2,467,003 | 4/1949 | Bach | 210—519 |
| 2,647,733 | 8/1953 | Knowles | 210—540 |
| 3,036,715 | 5/1962 | Gould | 210—520 |
| 1,076,721 | 10/1913 | Travis et al. | 210—74 X |
| 1,081,329 | 12/1913 | Potter | 210—74 X |
| 1,938,894 | 12/1933 | Darby et al. | 210—519 X |
| 2,098,463 | 11/1937 | Morehead | 210—525 |
| 2,249,049 | 7/1941 | Sayers et al. | 210—525 |
| 2,821,306 | 1/1958 | Davila | 210—525 |
| 2,894,637 | 7/1959 | Schreiber | 210—519 |
| 3,228,530 | 1/1966 | Quast et al. | 210—519 |
| 1,493,861 | 5/1924 | Kusch. | |
| 1,921,689 | 8/1933 | Meurk | 210—73 |

RUEBEN FRIEDMAN, *Primary Examiner.*

J. ADEE, *Assistant Examiner.*